United States Patent [19]
Ramesh et al.

[11] Patent Number: 5,435,922
[45] Date of Patent: Jul. 25, 1995

[54] METHOD OF REMOVING COLOR FROM WASTE WATER USING AN AQUEOUS DISPERSION POLYMER

[75] Inventors: Manian Ramesh, Naperville; Chandrashekar S. Shetty, Lisle, both of Ill.

[73] Assignee: Nalco Chemical Company, Naperville, Ill.

[21] Appl. No.: 77,235

[22] Filed: Jun. 14, 1993

[51] Int. Cl.⁶ .................................................. C02F 1/56
[52] U.S. Cl. .................................... 210/734; 162/189; 210/917; 210/928
[58] Field of Search ................ 162/189; 210/705, 725, 210/727, 728, 734, 733, 917, 928

[56] References Cited

U.S. PATENT DOCUMENTS

| | | | |
|---|---|---|---|
| 4,151,202 | 4/1979 | Hunter et al. | 260/567 |
| 4,425,238 | 1/1984 | Degen et al. | 210/917 |
| 4,715,962 | 12/1987 | Bhattacharyya et al. | 210/708 |
| 4,734,473 | 3/1988 | Fong et al. | 526/263 |
| 4,769,432 | 9/1988 | Fong | 526/291 |
| 4,802,992 | 2/1989 | Fong et al. | 210/709 |
| 4,851,128 | 7/1989 | Rose | 210/917 |
| 4,929,655 | 5/1990 | Takeda et al. | 524/458 |
| 4,968,435 | 11/1990 | Neff et al. | 210/734 |
| 5,006,590 | 4/1991 | Takeda et al. | 524/458 |
| 5,006,596 | 4/1991 | Chen et al. | 524/555 |
| 5,130,369 | 7/1992 | Hughes et al. | 524/846 |
| 5,137,641 | 8/1992 | Bhattacharyya et al. | 210/734 |
| 5,152,903 | 10/1992 | Neff et al. | 210/734 |
| 5,200,089 | 4/1993 | Siefert et al. | 210/917 |

FOREIGN PATENT DOCUMENTS

| | | | |
|---|---|---|---|
| 60-229959 | 4/1984 | Japan. | |
| WO89/02417 | 3/1989 | WIPO | 210/928 |

*Primary Examiner*—Peter A. Hruskoci
*Attorney, Agent, or Firm*—Ohlandt, Greeley & Ruggiero

[57] ABSTRACT

A method for removing color from a paper mill waste effluent which comprises the step of adding a low molecular weight hydrophobic polymer dispersion to the effluent. The hydrophobic dispersion is preferably formed from the precipitation polymerization of at least one hydrophilic monomer and a hydrophobic monomer in the presence of a precipitation aid, water, a chain transfer agent, and an initiator.

19 Claims, 1 Drawing Sheet

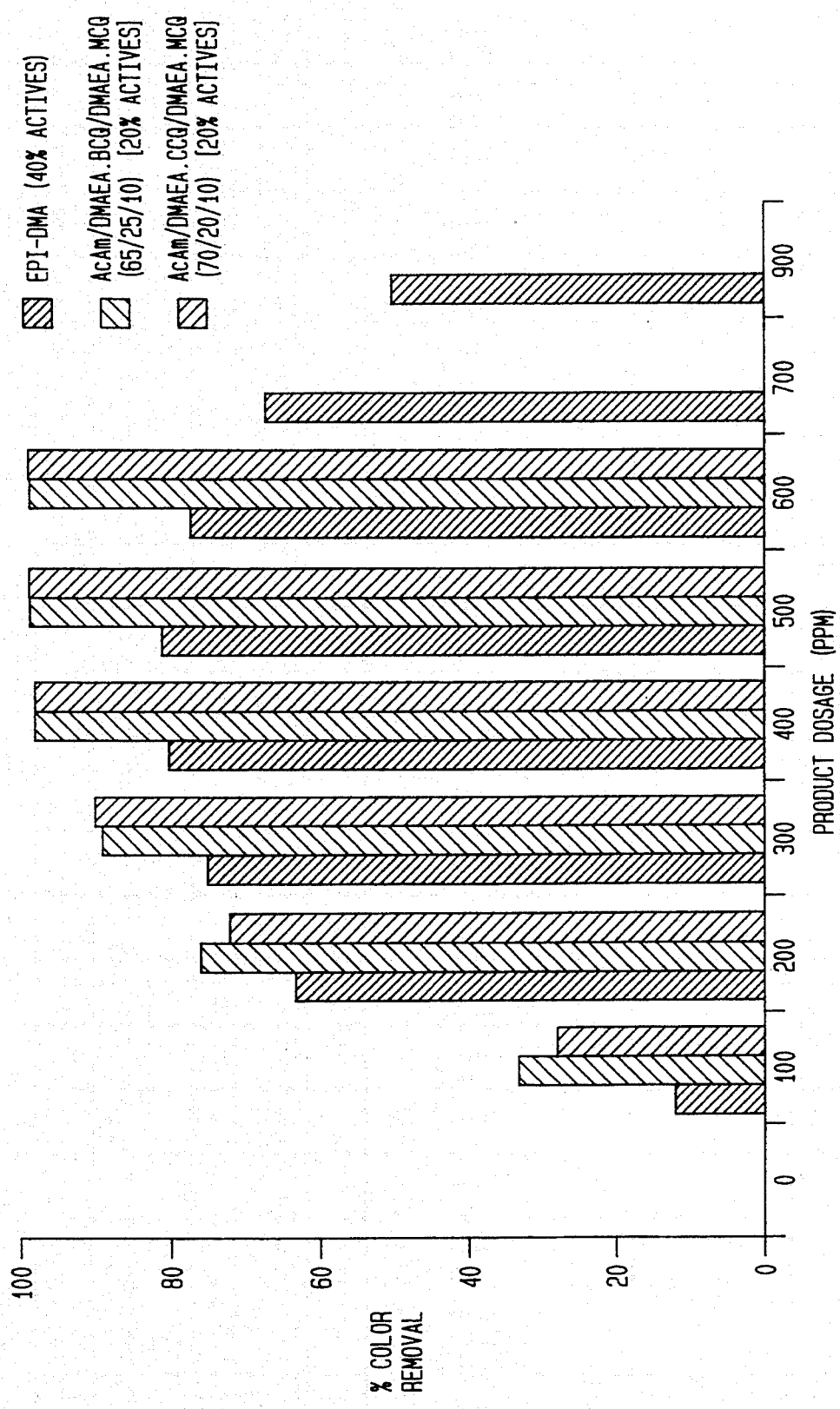

METHOD OF REMOVING COLOR FROM WASTE WATER USING AN AQUEOUS DISPERSION POLYMER

The present invention relates generally to the use of water soluble cationic polymer dispersions for the removal of color present in waste water effluents, especially from effluents discharged by the pulp and paper industries. These low molecular weight water soluble cationic polymer dispersions are preferably prepared using a precipitation aid and a chain transfer agent which have exhibited excellent performance in the removal of color caused by lignin.

BACKGROUND OF THE INVENTION

Color removal from the effluent streams of paper mills continues to be a problem within the pulp and paper industry. It is necessary that these downstream waste waters be treated for color removal prior to discharge into public waterways.

The United States wood pulp production capacity is approximately 60 million tons per year. Since the average cellulose content of wood is about 40%, 150 million tons of wood are needed to produce this 60 tons of pulp. The difference between these two numbers represents the lignin and hemicellulose which must be removed or separated in the pulping process in order to free the cellulose fibers.

The pulping process, however, does not remove 100% of the lignin present in the wood, with approximately 5% remaining after either Kraft or sulfite pulping (for mechanical pulping the amount is considerably higher). If a high grade paper is the desired end product, then this 5% residual lignin must be removed by bleaching the pulp.

Since over 35% of the pulp produced in the United States is bleached, there are about one million tons of lignin removed each year at the bleach plant, and most of this in the caustic extraction stage. This number is significant because in the removal process (i.e., bleaching), most of this residual lignin is solubilized. This solubilized lignin is a strong absorber of visible radiation resulting from the conjugation of unsaturated and quinodal moieties formed during the oxidation step in the bleach plant. Consequently, the bleach plant effluent is highly colored. Although there are other sources of color in paper mill waste effluent, it is readily apparent that where bleaching is performed its effluent can be expected to be the major contributor of waste color. Indeed, at Kraft, bleach mills the effluent from the first caustic extraction stage accounts for at least 70% of the waste color.

The goal of the pulping and bleaching operations is the removal of lignin and hemicellulose from the cellulose fiber in wood. The 95% that is removed by pulping is often burned as fuel in the process of recovering the inorganic chemicals present in the black liquor. In the bleaching operation, the 5% residual lignin is separated from the fibers by degradation and solubilization and ends up in the waste water. Chemical removal can, therefore, only be accomplished by reducing this solubility, which has proved to be a difficult task.

Therefore, the primary source of color in pulp is lignin. It has also been suggested that Kraft color is due to ketoenols produced from carbohydrates during the Kraft cook stage in the papermaking process. Chlorination of the pulp during the bleaching operation results in the formation of color bodies which are leached from the pulp by caustic alkali solutions. Thus, the caustic extract effluent contains a major proportion of the color bodies and the other organic materials which have to be disposed during the waste water treatment.

The process of color removal from the effluent stream is further complicated by the presence of lime, solid particulate matter like pulp, clay, dispersants/surface active materials and polymers used during various stages in the papermaking process. The solid particulate matter is commonly referred to as anionic trash.

Most governmental regulations pertaining to color removal from the effluent stream of a papermaking process are directed to true color, i.e., the color at pH of 7.6 after filtration through a 0.8 micrometer filter paper and expressed as Pt Co color units (i.e., platinum cobalt color using a DR2000 spectrophotometer). Nevertheless, there is increasing pressure on pulp and paper mills to lower the apparent color of the effluent water because that is the color visible to the naked eye as the effluent flows into public waterways. There are occasions when the true color of a system that has undergone treatment is low, but the corresponding apparent color is high. This problem is commonly caused by the presence of suspended particulate matter that causes an increase in the turbidity of the system. Therefore, it is important that any new treatment for color removal should not only remove the true color of the effluent, but should also lower the apparent color as well.

The pressure to remove color comes primarily from state environmental agencies. Previously, it was thought that the discharge of colored waste affected only the aesthetic value of the receiving body of water; however, biologists are becoming increasingly concerned about possible toxic effects, the effect of reduced light transmittance through the water causing reduced levels of photosynthetic activity, and of course, the resultant drop in dissolved oxygen concentration because of this drop in activity. Furthermore, although these colored, waste products are fairly refractory towards biological oxidation and since they become degraded in the aquatic environment, the oxidation products may be potentially harmful.

It has been shown that by-products are water soluble, and that a significant amount is produced. This puts severe demands on chemicals to be used for color removal. There are techniques already available, however, that can remove greater than 90% of the color from either total mill effluent or isolated waste streams, such as from the caustic extraction stage of the bleach plant. These techniques include chemical (e.g., alum, ferric, lime or polyelectrolytes), biological (e.g., white rot fungus) and physical processes (e.g., ultrafiltration, ion exchange and carbon absorption). None enjoys widespread use because of unfavorable economics.

The demands on a product used in a color removal application are quite severe, i.e., the product must be capable of reacting with the color bodies in a manner which results in their becoming insoluble and, because of the extremely large amount produced, the color removal product must work at very low weight ratios relative to the organic being removed or its use will be precluded by prohibitive costs.

A common problem associated with conventional chemical treatment methods, such as epichlorohydrin/dimethylamine (Epi/DMA), is the fact that those polymers cannot lower the color of a system below a certain value beyond which they tend to re-disperse the color. This problem is commonly referred to as "overdosage."

The present inventors have discovered through extensive experimentation that hydrophobically modified copolymers are excellent agents for the removal of both "apparent" and "true" color in pulp and paper mill waste water. The color removal characteristics of acrylamide (AcAm) is significantly improved by imparting a certain degree of hydrophobicity. Modification is accomplished by copolymerizing AcAm with a selected hydrophobic monomer to form a hydrophobic polyelectrolyte. These hydrophobic polyelectrolytes display excellent replacement ratios, while avoiding the problem of "overdosage" which frequently arises when conventional polymers are used to remove color (See FIG. 1). These polyelectrolytes have a unique mode of action which could lead to an all organic treatment for removal of color in pulp and paper mill waste water.

The present inventors have discovered that a low molecular weight water soluble cationic polymer dispersion can be used to successfully remove color from pulp and paper waste water effluents. This unique color removal agent is prepared by polymerizing at least one hydrophilic monomer, e.g., acrylamide and/or dimethylaminoethyl(meth)acrylate methyl chloride quaternary, and a hydrophobic monomer, e.g. dimethylaminoethyl(meth)acrylate benzyl chloride quaternary or dimethylaminoethyl(meth)acrylate cetyl chloride quaternary, in the presence of water, a chain transfer agent, a precipitation aid and an initiator.

U.S. Pat. Nos. 5,006,590 (Takeda et al.), which issued on Apr. 9, 1991, and 4,929,655 (Takeda et al.), which issued on May 29, 1990, pertain to various high molecular weight water soluble cationic polymer dispersions formed from acrylamide, acrylamidopropyldimethylbenzylammonium chloride, a precipitation aid and an initiator. However, these dispersions have extremely high molecular weights (e.g., 6,000,000 to 10,000,000) which cause them to act as a flocculant, not as a coagulant which is required during color removal.

The present inventors have discovered that by increasing the initiator concentration and polymerizing the monomers in the presence of a chain transfer agent and a precipitation aid, a low molecular weight (e.g., 100,000 to 1,500,000) water soluble cationic dispersant can be produced that acts as coagulant and exhibits extremely good color removal properties.

The present invention also provides many additional advantages which shall become apparent as described below.

SUMMARY OF THE INVENTION

Low molecular weight hydrophobic polymer dispersions have been found to be useful in the removal of color from pulp and paper mill waste waters.

The hydrophobic dispersion according to the present invention is formed from the precipitation polymerization of at least one hydrophilic monomer and a hydrophobic monomer, in the presence of a precipitation aid, water, a chain transfer agent, and an initiator. This copolymer dispersion typically has a molecular weight in the range between about 100,000 to about 1,500,000.

Other and further objects, advantages and features of the present invention will be understood by reference to the following specification.

BRIEF DESCRIPTION OF THE DRAWINGS

FIG. 1 is a graph plotting % color removal versus product dosages for EPI-DMA, AcAm/DMAEA.BCQ/DMAEA.MCQ (65/25/10), and AcAm/DMAEA.CCQ/DMAEA.MCQ (70/20/10).

DESCRIPTION OF THE PREFERRED EMBODIMENTS

The hydrophobic dispersions described herein are particularly useful in color removal from pulp and paper waste water effluents. These hydrophobic dispersions have been shown to be efficient agents for the removal of color caused by lignins and their derivatives present in the paper mill waste water effluent.

It has been discovered that the performance of acrylamide (AcAm) and other hydrophilic monomers can be significantly improved by incorporating a certain degree of hydrophobicity. Such a modification can be accomplished by, for example, copolymerizing AcAm and/or dimethylaminoethyl(meth)acrylate methyl chloride quaternary with a hydrophobic monomer, such as $C_6$ to $C_{20}$ alkyl quaternaries of dimethylaminoethylacrylate (DMAEA) or dimethylaminoethylmethacrylate (DMAEM).

Moreover, the molecular weight of the dispersion can be kept low in the range of between about 100,000 to about 1,500,000, by the addition of a chain transfer agent and increased concentration of polymer initiator in order to impart better color removal properties to the dispersion.

This unique color removal agent comprises a hydrophobic polymer dispersion. The dispersion is preferably formed by the precipitation polymerization of at least one hydrophilic monomer and a hydrophobic monomer in the presence of a precipitation aid, water, a chain transfer agent, and an initiator.

The hydrophobic dispersion is prepared by polymerizing a water soluble mixture of a cationic monomer (hydrophobic monomer) represented by the following general formula (I):

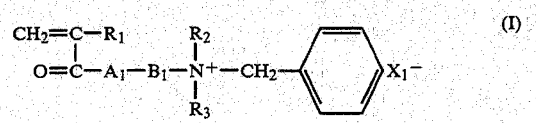

where $R_1$ is either hydrogen or $CH_3$; $R_2$ and $R_3$ are each an alkyl group having 1 to 3 carbon atoms; $A_1$ is either an oxygen atom or NH; $B_1$ is either an alkylene group having 2 to 4 carbon atoms or a hydroxypropylene group, and $X_1^-$ is an anionic counterion, and a second cationic monomer (hydrophilic monomer) of (meth)acrylamide and/or a monomer represented by the following general formula (II):

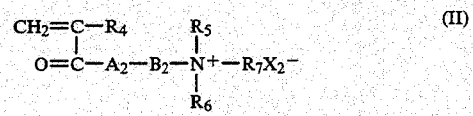

where $R_4$ is either hydrogen or $CH_3$; $R_5$ and $R_6$ are each an alkyl group having 1 to 2 carbon atoms; $R_7$ is a hydrogen atom or an alkyl group having 1 to 2 carbon atoms; $A_2$ is either an oxygen atom or NH; $B_2$ is either an alkylene group having 2 to 4 carbon atoms or a hydroxypropylene group and $X_2^-$ is an anionic counterion, wherein the polymerization is carried out in the presence of a precipitating aid (i.e., a polyvalent anion salt), water, an initiator and chain transfer agent.

Examples of hydrophobic monomers represented by the general formula (I) include $C_6$ to $C_{20}$ alkyl quaternaries of dimethylaminoethyl(meth)acrylate, diethylaminoethyl (meth)acrylate, dimethylaminopropyl(meth)acrylamide and dimethylhydroxypropyl(meth)acrylate, diethylaminopropyl (meth)acrylamide and dimethylaminohydroxylpropyl (meth)acrylate. Preferred monomers are dimethylaminoethyl (meth)acrylate benzyl chloride quaternary and dimethylaminoethyl (meth)acrylate cetyl chloride quaternary.

Examples of hydrophilic monomers represented by the general formula (II) include methylated and ethylated quaternary salts of dimethylaminoethyl (meth)acrylate, diethylaminoethyl(meth)acrylate, dimethylaminopropyl (meth)acrylamide, diethylaminopropyl(meth)acrylamide and dimethylhydroxypropyl(meth)acrylate. One preferred hydrophilic monomer is dimethylaminoethyl acrylate methyl chloride quaternary.

The hydrophobic dispersion of this invention is soluble in both water and the aqueous salt solution.

One preferred hydrophobic dispersion comprises the following monomers: acrylamide, a dimethylaminoethyl (meth)acrylate having $C_6$ to $C_{20}$ chloride quaternary, and/or dimethylaminoethyl(meth)acrylate methyl chloride quaternary. The acrylamide is present in an amount between about 0 to about 90 mole %, more preferably about 60 to about 90 mole % The dimethylaminoethyl (meth)acrylate methyl chloride quaternary is present in an amount between about 5 to about 50 mole %, more preferably about 10 to about 25 mole %. The dimethylaminoethyl(meth)acrylate having $C_6$ to $C_{20}$ chloride quaternary is preferably either dimethylaminoethyl (meth)acrylate cetyl chloride quaternary or dimethylaminoethyl(meth)acrylate benzyl chloride quaternary. The dimethylaminoethylacrylate having $C_6$ to $C_{20}$ chloride quaternary is preferably present in an amount of between about 5 to about 100 mole %, more preferably about 10 to about 40 mole %.

The polymer initiator is preferably selected from the group consisting of 2,2,-azobis(2-amidopropane)hydrochloride (V-50), 2,2,-azobis(N,N'-dimethylene isobutylamide) dihydrochloride (V-044), ammonium persulfate (APS), ammonium persulfate/sodium meta bisulfite (APS/SBS), and ferric/ascorbic acid. The initiator is typically present in an amount between about 400 to 6,000 ppm based on the monomers used.

The chain transfer agent is preferably selected from the group consisting of benzyl alcohol, isopropyl alcohol, tertiary amines, sodium bisulfite and sodium formate. The chain transfer agent is typically present in an amount between about 200 to about 2,000 ppm based on the monomers.

The precipitation aid (i.e., multivalent anionic salt) used to deposit the polymer in the present invention are chlorides, nitrates, sulfates, phosphates or combinations thereof. Typical examples of these salts include sodium nitrate, ammonium chloride, sodium chloride, ammonium sulfate, sodium sulfate, magnesium sulfate, aluminum sulfate, ferrous sulfate, ammonium hydrogenphosphate, sodium hydrogenphosphate and potassium hydrogenphosphate. The precipitation aid is used in the form a salt aqueous solution at a concentration of 15% or more, preferably 20% by weight or more. The precipitation aid is typically present during the reaction in an amount between about 16.5 to about 18 weight % based on batch size. At the end of the reaction more salt, typically in an amount between about 0.5 to about 5.0 weight %, is added. The amount of precipitation aid in the final reaction product is in the range between about 18.0 to about 22.5% by weight of the final product.

The present invention can best be understood by reference to the following working and comparative examples.

EXAMPLE 1

The conventional color removal polymer of epichlorohydrin/dimethylamine (Epi/DMA) was tested for its color removal capabilities and the results are set forth below in Table 1:

TABLE 1

| POLYMER DOSAGE (PPM) | PT. CO. COLOR UNITS | % COLOR REMOVAL |
|---|---|---|
| EPI/DMA | | |
| 100 | 1424 | 12 |
| 200 | 596 | 63 |
| 300 | 398 | 75 |
| 400 | 314 | 80 |
| 500 | 312 | 81 |
| 600 | 374 | 77 |
| 700 | 534 | 67 |
| 900 | 804 | 50 |

As demonstrated by the above, the conventional system of Epi/DMA experienced "overdosage" at a concentration above ppm and only reached a maximum color removal rate of 81%.

EXAMPLE 2

A low molecular weight polymer dispersion was prepared from 65 mole % acrylamide (AcAm), 25 mole % dimethylaminoethylacrylate benzyl chloride quaternary (DMAEA.BCQ) and 10 mole % dimethylaminoethylacrylate methyl chloride quaternary (DMAEA.MCQ) at 20% actives in accordance with the present invention. The dispersion was prepared from the following components:

| | | |
|---|---|---|
| 50.00 | grams | Poly(DMAEA.MCQ) 20% actives or Diallyldimethyl ammonium chloride (90/10 mole %, 20% act.) |
| 6.00 | grams | Glycerol |
| 144.45 | grams | Acrylamide (48.0%) |
| 126.78 | grams | DMAEA.BCQ (80%) |
| 36.21 | grams | DMAEA.MCQ (80%) |
| 100.00 | grams | Ammonium sulfate |
| 60.00 | grams | Aluminum sulfate |
| 10.00 | grams | V-50 (10% solution) |
| 1.00 | gram | Benzyl alcohol |
| 395.16 | grams | De-ionized water |
| 60.00 | grams | Ammonium sulfate |
| 10.00 | grams | Acetic acid |
| 0.40 | grams | Versene |

The dispersion was formed by weighing out the stabilizer (i.e., in the case of poly(DMAEA.MCQ), 0.5% solution BF viscosity 42 cp, #1 spindle, 60 rpm) in a one liter beaker. Thereafter, the glycerol and de-ionized water were added to the beaker and stirred for approximately 30 minutes. Then ammonium sulfate and aluminum sulfate were added in small increments, and stirring was continued so that the viscosity of the solution decreased as the addition proceeded. The monomers, e.g., DMAEA.BCQ and acrylamide, and benzyl alcohol were then added to the solution slowly without splashing. The solution was continuously stirred while Versene was added into the beaker.

The reaction mixture contained in the one liter beaker was then added to a five necked head equipped reaction vessel with stirrer, nitrogen purge tube, thermometer, condenser, thermocouple and a stopper. The reaction mixture was heated to 50° C. while stirring at @400 rpm and maintaining a nitrogen flow of about 10 psig. The V-50 initiator (1% aqueous solution) was added when the reaction mixture reached 50° C. The reaction mixture was heated at 50° C. for 4 hours and thereafter cooled to ambient temperature. Then the second batch of ammonium sulfate and acetic acid was added to the reaction mixture which was stirred for 15 minutes. The final polymer dispersion product was then removed from the reaction vessel and stored.

EXAMPLE 3

A low molecular weight polymer dispersion was prepared from 80 mole % acrylamide (AcAm) and 20 mole % dimethylaminoethylacrylate benzyl chloride quaternary (DMAEA.BCQ) at 20% actives in accordance with the present invention. The dispersion was prepared from the following components:

| | | |
|---|---|---|
| 50.00 | grams | Poly(DMAEA.MCQ) 20% actives or Diallyldimethyl ammonium chloride (90/10 mole %, 20% act.) |
| 6.00 | grams | Glycerol |
| 204.38 | grams | Acrylamide (50.2%) |
| 121.76 | grams | DMAEA.BCQ (80%) |
| 80.00 | grams | Ferrous sulfate |
| 100.00 | grams | Aluminum sulfate |
| 8.00 | grams | V-50 (10% solution) |
| 1.50 | gram | Benzyl alcohol |
| 387.96 | grams | De-ionized water |
| 30.00 | grams | Ammonium sulfate |
| 10.00 | grams | Acetic acid |
| 0.40 | grams | Versene |

The dispersion was formed by weighing out the stabilizer (i.e., in the case of poly(DMAEA.MCQ), 0.5% solution BF viscosity 42 cp, #1 spindle, 60 rpm) in a one liter beaker. Thereafter, the glycerol and de-ionized water were added to the beaker and stirred for approximately 30 minutes. Then ferrous sulfate and aluminum sulfate were added in small increments, and stirring was continued so that the viscosity of the solution decreased as the addition proceeded. The monomers, e.g., DMAEA.BCQ and acrylamide, and benzyl alcohol were then added to the solution slowly without splashing. The solution was continuously stirred while Versene was added into the beaker.

The reaction mixture contained in the one liter beaker was then added to a five necked head equipped reaction vessel with stirrer, nitrogen purge tube, thermometer, condenser, thermocouple and a stopper. The reaction mixture was heated to 50° C. while stirring at @400 rpm and maintaining a nitrogen flow of about 10 psig. The V-50 initiator (1% aqueous solution) was added when the reaction mixture reached 50° C. The reaction mixture was heated at 50° C. for 4 hours and thereafter cooled to ambient temperature. Then the second batch of ammonium sulfate and acetic acid was added to the reaction mixture which was stirred for 15 minutes. The final polymer dispersion product was then removed from the reaction vessel and stored.

The RSV/IV of the product was 8.2/5.1 dL/gm when measured in 0.125 m of sodium nitrate for 0.045% polymer solution in water.

EXAMPLE 4

A low molecular weight polymer dispersion was prepared from 70 mole % acrylamide (AcAm) and 30 mole % dimethylaminoethylacrylate benzyl chloride quaternary (DMAEA.BCQ) at 20% actives in accordance with the present invention. The dispersion was prepared from the following components:

| | | |
|---|---|---|
| 50.00 | grams | Poly(DMAEA.MCQ) 20% actives or Diallyldimethyl ammonium chloride (90/10 mole %, 20% act.) |
| 6.00 | grams | Glycerol |
| 157.92 | grams | Acrylamide (48.2%) |
| 154.85 | grams | DMAEA.BCQ (80%) |
| 100.00 | grams | Ammonium sulfate |
| 70.00 | grams | Aluminum sulfate |
| 10.00 | grams | V-50 (10% solution) |
| 1.60 | gram | Benzyl alcohol |
| 419.23 | grams | De-ionized water |
| 20.00 | grams | Ammonium sulfate |
| 10.00 | grams | Acetic acid |
| 0.40 | grams | Versene |

The dispersion was formed by weighing out the stabilizer (i.e., in the case of poly(DMAEA.MCQ), 0.5% solution BF viscosity 47 cp, #1 spindle, 60 rpm) in a one liter beaker. Thereafter, the glycerol and de-ionized water were added to the beaker and stirred for approximately 30 minutes. Then ammonium sulfate and aluminum sulfate were added in small increments, and stirring was continued so that the viscosity of the solution decreased as the addition proceeded. The monomers, e.g., DMAEA.BCQ and acrylamide, and benzyl alcohol were then added to the solution slowly without splashing. The solution was continuously stirred while Versene was added into the beaker.

The reaction mixture contained in the one liter beaker was then added to a five necked head equipped reaction vessel with stirrer, nitrogen purge tube, thermometer, condenser, thermocouple and a stopper. The reaction mixture was heated to 50° C. while stirring at @400 rpm and maintaining a nitrogen flow of about 10 psig. The V-50 initiator (1% aqueous solution) was added when the reaction mixture reached 50° C. The reaction mixture was heated at 50° C. for 4 hours and thereafter cooled to ambient temperature. Then the second batch of ammonium sulfate and acetic acid was added to the reaction mixture which was stirred for 15 minutes. The final polymer dispersion product was then removed from the reaction vessel and stored.

The RSV/IV of the product was 6.13/4.1 dL/gm when measured in 0.125 m of sodium nitrate for 0,045% polymer solution in water.

EXAMPLE 5

A low molecular weight polymer dispersion was prepared from 70 mole % acrylamide (AcAm), 20 mole % dimethylaminoethylacrylate cetyl chloride quaternary (DMAEA.CCQ) and 10 mole % dimethylaminoethylacrylate methyl chloride quaternary (DMAEA.MCQ) at 15% actives in accordance with the present invention. The dispersion was prepared from the following components:

| | | |
|---|---|---|
| 50.00 | grams | Poly(DMAEA.MCQ) 20% actives or Diallyldimethyl ammonium chloride (90/10 mole %, 20% act.) |
| 6.00 | grams | Glycerol |
| 101.35 | grams | Acrylamide (48.2%) |
| 586.71 | grams | DMAEA.CCQ (14%) |
| 23.24 | grams | DMAEA.MCQ (81.8%) |
| 100.00 | grams | Ammonium sulfate |
| 70.00 | grams | Aluminum sulfate |
| 10.00 | grams | V-50 (10% solution) |
| 2.00 | gram | Benzyl alcohol |
| 15.30 | grams | De-ionized water |
| 25.00 | grams | Ammonium sulfate |
| 10.00 | grams | Acetic acid |
| 0.40 | grams | Versene |

The dispersion was formed by weighing out the stabilizer (i.e., in the case of poly(DMAEA.MCQ), 0.5% solution BF viscosity 42 cp, #1 spindle, 60 rpm) in a one liter beaker. Thereafter, the glycerol and de-ionized water were added to the beaker and stirred for approximately 30 minutes. Then ammonium sulfate and aluminum sulfate were added in small increments, and stirring was continued so that the viscosity of the solution decreased as the addition proceeded. The monomers, e.g., DMAEA.CCQ and acrylamide, and benzyl alcohol were then added to the solution slowly without splashing. The solution was continuously stirred while Versene was added into the beaker.

The reaction mixture contained in the one liter beaker was then added to a five necked head equipped reaction vessel with stirrer, nitrogen purge tube, thermometer, condenser, thermocouple and a stopper. The reaction mixture was heated to 50° C. while stirring at @400 rpm and maintaining a nitrogen flow of about 10 psig. The V-50 initiator (1% aqueous solution) was added when the reaction mixture reached 50° C. The reaction mixture was heated at 50 ° C. for 4 hours and thereafter cooled to ambient temperature. Then the second batch of ammonium sulfate and acetic acid was added to the reaction mixture which was stirred for 15 minutes. The final polymer dispersion product was then removed from the reaction vessel and stored.

The RSV/IV was 4.04/2.32 dL/gm when measured in 0.125 m sodium nitrate solution for 0.045% polymer.

EXAMPLE 6

A low molecular weight polymer dispersion was prepared from 70 mole % acrylamide (AcAm), 10 mole % dimethylaminoethylacrylate benzyl chloride quaternary (DMAEA.BCQ) and 20 mole % dimethylaminoethylacrylate cetyl chloride quaternary (DMAEA.CCQ) at 10% actives in accordance with the present invention. The dispersion was prepared from the following components:

| | | |
|---|---|---|
| 25.00 | grams | Poly(DMAEA.MCQ) 20% actives or Diallyldimethyl ammonium chloride (90/10 mole %, 20% act.) |
| 6.00 | grams | Glycerol |
| 64.35 | grams | Acrylamide (48.2%) |
| 21.04 | grams | DMAEA.BCQ (80%) |
| 372.52 | grams | DMAEA.CCQ (14%) |
| 80.00 | grams | Ammonium sulfate |
| 100.00 | grams | Aluminum sulfate |
| 3.00 | grams | V-50 (10% solution) |
| 1.20 | gram | Benzyl alcohol |
| 306.49 | grams | De-ionized water |
| 10.00 | grams | Ammonium sulfate |
| 10.00 | grams | Acetic acid |
| 0.40 | grams | Versene |

The dispersion was formed by weighing out the stabilizer (i.e., in the case of poly(DMAEA.MCQ), 0.5% solution BF viscosity 67 cp, #1 spindle, 60 rpm) in a one liter beaker. Thereafter, the glycerol and de-ionized water were added to the beaker and stirred for approximately 30 minutes. Then ammonium sulfate and aluminum sulfate were added in small increments, and stirring was continued so that the viscosity of the solution decreased as the addition proceeded. The monomers, e.g., DMAEA.CCQ, DMAEA.BCQ and acrylamide, and benzyl alcohol were then added to the solution slowly without splashing. The solution was continuously stirred while Versene was added into the beaker.

The reaction mixture contained in the one liter beaker was then added to a five necked head equipped reaction vessel with stirrer, nitrogen purge tube, thermometer, condenser, thermocouple and a stopper. The reaction mixture was heated to 50° C. while stirring at @400 rpm and maintaining a nitrogen flow of about 10 psig. The V-50 initiator (1% aqueous solution) was added when the reaction mixture reached 50° C. The reaction mixture was heated at 50° C. for 4 hours and thereafter cooled to ambient temperature. Then the second batch of ammonium sulfate and acetic acid was added to the reaction mixture which was stirred for 15 minutes. The final polymer dispersion product was then removed from the reaction vessel and stored.

The RSV/IV was 8.8/4.92 dL/gm when measured in 0.125 m of sodium nitrate solution for 0.045% polymer.

EXAMPLE 7

A low molecular weight polymer dispersion was prepared from 65 mole % acrylamide (AcAm), 25 mole % dimethylaminoethylacrylate benzyl chloride quaternary (DMAEA.BCQ) and 10 mole % dimethylaminoethylacrylate methyl chloride quaternary (DMAEA.MCQ) at 20% actives in accordance with the present invention. The dispersion was prepared from the following components:

| | | |
|---|---|---|
| 50.00 | grams | Poly(DMAEA.MCQ) 20% actives or Diallyldimethyl ammonium chloride (90/10 mole %, 20% act.) |
| 6.00 | grams | Glycerol |
| 144.45 | grams | Acrylamide (48.0%) |
| 126.78 | grams | DMAEA.BCQ (80%) |
| 36.21 | grams | DMAEA.MCQ (80%) |
| 100.00 | grams | Ammonium sulfate |
| 60.00 | grams | Aluminum sulfate |
| 4.00 | grams | V-50 (1% solution) |
| 0.04 | gram | Benzyl alcohol |
| 401.82 | grams | De-ionized water |
| 60.00 | grams | Ammonium sulfate |
| 10.00 | grams | Acetic acid |
| 0.40 | grams | Versene |

The dispersion was formed by weighing out the stabilizer (i.e., in the case of poly(DMAEA.MCQ), 0.5% solution BF viscosity 42 cp, #1 spindle, 60 rpm) in a one liter beaker. Thereafter, the glycerol and de-ionized water were added to the beaker and stirred for approximately 30 minutes. Then ammonium sulfate and aluminum sulfate were added in small increments, and stirring was continued so that the viscosity of the solution decreased as the addition proceeded. The monomers, e.g., DMAEA.BCQ and acrylamide, and benzyl alcohol were then added to the solution slowly without splashing. The solution was continuously stirred while Versene was added into the beaker.

The reaction mixture contained in the one liter beaker was then added to a five necked head equipped reaction vessel with stirrer, nitrogen purge tube, thermometer, condenser, thermocouple and a stopper. The reaction mixture was heated to 50° C. while stirring at @400 rpm and maintaining a nitrogen flow of about 10 psig. The V-50 initiator (1% aqueous solution) was added when the reaction mixture reached 50° C. The reaction mixture was heated at 50° C. for 4 hours and thereafter cooled to ambient temperature. Then the second batch of ammonium sulfate and acetic acid was added to the reaction mixture which was stirred for 15 minutes. The final polymer dispersion product was then removed from the reaction vessel and stored.

This dispersion was formed with substantially reduced amounts of chain transfer agent (i.e., benzyl alcohol) and polymer initiator (i.e., V-50) than the dispersion described in Example 2 above. As such, the RSV/IV was extremely high, i.e., 20.6/16.72 dL/gm, when measured in 0.125 m of sodium nitrate solution for 0.045% polymer. The reduced levels of chain transfer agent and polymer initiator produced a high molecular weight dispersion which gelled making it unsuitable for color removal applications.

While we have shown and described several embodiments in accordance with our invention, it is to be clearly understood that the same are susceptible to numerous changes apparent to one skilled in the art. Therefore, we do not wish to be limited to the details shown and described but intend to show all changes and modifications which come within the scope of the appended claims.

What is claimed is:

1. A method for removing color bodies from a paper mill waste effluent which comprises the steps of:
   adding from about 100 to about 600 pans per million of a hydrophobic polymer dispersion to said effluent, said hydrophobic polymer dispersion having been formed from the polymerization of:
   a. at least one hydrophilic monomer selected from the group consisting of acrylamide, (meth)acrylamide, and cationic monomers represented by the formula:

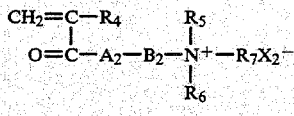

wherein $R_4$ is either hydrogen or $CH_3$; $R_5$ and $R_6$ are each an alkyl group having 1 to 2 carbon atoms; $R_7$ is a hydrogen atom or an alkyl group having 1 to 2 carbon atoms: $A_2$ is either an oxygen atom or NH; $B_2$ is either an alkylene group having 2 to 4 carbon atoms or a hydroxypropylene group and $X_2^-$ is an anionic counterion; and, b. about 5 to about 40 mole percent of a hydrophobic monomer of the formula:

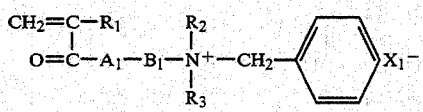

wherein $R_1$ is either hydrogen or $CH_3$; $R_2$ and $R_3$ are each an alkyl group having 1 to 3 carbon atoms; $A_1$ is either an oxygen atom or NH; $B_1$ is either an alkylene group having 2 to 4 carbon atoms or a hydroxypropylene group, and $X_1^-$ is an anionic counterion, in the presence of
   i. a precipitation aid,
   ii. water,
   iii. a chain transfer agent, and
   iv. an initiator, wherein said dispersion has a molecular weight in the range between about 100,000 to about 1,500,000, coagulating the color bodies in the effluent; and then, removing the coagulated color bodies from the effluent.

2. The method according to claim 1 wherein said precipitating aid is selected from the group consisting of: chlorides, nitrates, sulfates and phosphates.

3. The method according to claim 2 wherein said sulfates are selected from the group consisting of: ammonium sulfate, sodium sulfate, magnesium sulfate, ferrous sulfate, and aluminum sulfate.

4. The method according to claim 2 wherein said phosphates are selected from the group consisting of: ammonium hydrogenphosphate, sodium hydrogenphosphate and potassium hydrogenphosphate.

5. The method according to claim 4 wherein said precipitation aid is present in an amount between about 16.5 to about 22.5% by weight.

6. The method according to claim 1 wherein a monomer selected from the group consisting of acylamide and (meth)acrylamide is present in an amount between about 0 to about 90 mole percent.

7. The method according to claim 1 wherein a monomer selected from the group consisting of acrylamide and (meth)acrylamide is present in an amount between about 60 to about 90 mole percent.

8. The method according to claim 1 wherein said hydrophilic monomer is dimethylaminoethyl(meth)acrylate methyl chloride quaternary which is present in an amount between about 5 to about 50 mole percent.

9. The method according to claim 1 wherein said hydrophilic monomer is dimethylaminoethyl(meth)acrylate methyl chloride quaternary which is present in an amount between about 10 to about 25 mole percent.

10. The method according to claim 1 wherein said hydrophobic monomer is dimethylaminoethyl(meth)acrylate benzyl chloride quaternary which is present in an amount between about 10 to about 40 mole percent.

11. The method according to claim 1 wherein said initiator is selected from the group consisting of 2,2'-azobis(2-amidopropane)hydrochloride, 2,2'-azobis(N,N'-dimethylene isobutylamide) dihydrochloride, ammonium persulfate, ammonium persulfate/sodium meta bisulfite, and ferric/ascorbic acid.

12. The method according to claim 11 wherein said polymer initiator is present in an amount between about 400 to 6,000 ppm based on monomers used.

13. The method according to claim 1 wherein said chain transfer agent is selected from the group consisting of: benzyl alcohol, isopropyl alcohol, tertiary amines, sodium bisulfite and sodium formate.

14. The method according to claim 13 wherein said chain transfer agent is present in an amount between about 200 to about 2,000 ppm based on the monomers.

15. The method of claim 1 wherein the hydrophobic dispersion polymer is a copolymer of acrylamide, dimethylaminoethylacrylate benzyl chloride quaternary and dimethylaminoethylacrylate methyl chloride quaternary in a mole ratio of about 65:25:10.

16. A method for removing color bodies from a paper mill effluent which comprises the steps of:
  adding from about 100 to about 600 parts per million of a hydrophobic polymer dispersion to said effluent, said hydrophobic polymer dispersion having been formed from the polymerization of
    a. at least one hydrophilic monomer selected from the group consisting of acrylamide, (meth)acrylamide, and cationic monomers represented by the formula:

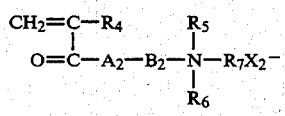

wherein $R_4$ is either hydrogen or $CH_3$; $R_5$ and $R_6$ are each an alkyl group having 1 to 2 carbon atoms; $R_7$ is a hydrogen atom or an alkyl group having 1 to 2 carbon atoms; $A_2$ is either an oxygen atom or NH; $B_2$ is either an alkylene group having 2 to 4 carbon atoms or a hydroxypropylene group and $X_2^-$ is an anionic counterion; and,
    b. about 5 to about 40 mole percent of a hydrophobic monomer of the formula:

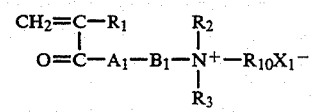

wherein $R_1$ is either hydrogen or $CH_3$; $R_2$ and $R_3$ are each an alkyl group having 1 to 3 carbon atoms; $A_1$ is either an oxygen atom or NH; $B_1$ is either an alkylene group having 2 to 4 carbon atoms or a hydroxypropylene group, $R_{10}$ is alkyl of from 6–20 carbon atoms, and $X_1^-$ is an anionic counterion, in the presence of
    i. a precipitation aid,
    ii. water,
    iii. a chain transfer agent, and
    iv. an initiator, wherein said dispersion has a molecular weight in the range between about 100,000 to about 1,500,000, coagulating the color bodies in the effluent; and then, removing the coagulated color bodies from the effluent.

17. The method according to claim 16 wherein said hydrophilic monomer is selected from the group consisting of acrylamide and dimethylaminoethyl(meth)acrylate methyl chloride quaternary.

18. The method of claim 16 wherein the hydrophobic monomer is dimethylaminoethylacrylate cetyl chloride quaternary.

19. The method of claim 16 wherein the hydrophobic dispersion polymer is a copolymer of acrylamide, dimethylaminoethylacrylate cetyl chloride quaternary and dimethylaminoethylacrylate methyl chloride quaternary in a mole ratio of about 70:20:10.

* * * * *

UNITED STATES PATENT AND TRADEMARK OFFICE
CERTIFICATE OF CORRECTION

PATENT NO. : 5,435,922
DATED : JULY 25, 1995
INVENTOR(S) : MANIAN RAMESH, ET AL

It is certified that error appears in the above-indentified patent and that said Letters Patent is hereby corrected as shown below:

COLUMN 11, line 44, claim 1, adding from about 100 to about 600 <u>pans</u> per million should read:

--adding from about 100 to about 600 parts per million--

COLUMN 14, LINE 13, CLAIM 16

$X_1$-is an anionic counterion <u>m</u> the presence of should read:

--$X_1$-is an anionic counterion, in the presence of --

Signed and Sealed this

Nineteenth Day of September, 1995

Attest:

BRUCE LEHMAN

*Attesting Officer*     *Commissioner of Patents and Trademarks*